US010316756B2

(12) United States Patent
Gentile et al.

(10) Patent No.: US 10,316,756 B2
(45) Date of Patent: Jun. 11, 2019

(54) DEFORMABLE TURBINE BEARING MOUNT FOR AIR TURBINE STARTER

(71) Applicant: HONEYWELL INTERNATIONAL INC., Morris Plains, NJ (US)

(72) Inventors: David P Gentile, Chandler, AZ (US); Peter Kenneth Zeiner, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 400 days.

(21) Appl. No.: 15/194,900

(22) Filed: Jun. 28, 2016

(65) Prior Publication Data

US 2017/0370294 A1    Dec. 28, 2017

(51) Int. Cl.
| | | |
|---|---|---|
| F01D 19/00 | (2006.01) | |
| F02C 7/277 | (2006.01) | |
| F02C 7/20 | (2006.01) | |
| F01D 21/04 | (2006.01) | |

(52) U.S. Cl.
CPC ............ *F02C 7/277* (2013.01); *F01D 21/045* (2013.01); *F02C 7/20* (2013.01); *F05D 2220/50* (2013.01); *F05D 2260/311* (2013.01)

(58) Field of Classification Search
CPC ........ F01D 21/04; F01D 21/045; F01D 21/14; F01D 25/162
See application file for complete search history.

(56) References Cited

U.S. PATENT DOCUMENTS

| | | | |
|---|---|---|---|
| 6,447,248 B1 | 9/2002 | Kastl et al. | |
| 6,533,541 B1 | 3/2003 | Farnsworth et al. | |
| 6,681,579 B2 * | 1/2004 | Lane | F01D 25/18 60/39.091 |
| 6,814,539 B2 * | 11/2004 | Farnsworth | F01D 21/045 415/121.1 |
| 7,066,710 B2 * | 6/2006 | Wiggins | F16K 31/1635 137/488 |
| 7,153,091 B2 | 12/2006 | Stephenson et al. | |
| 8,105,018 B2 * | 1/2012 | Gockel | F02C 7/275 415/122.1 |

(Continued)

FOREIGN PATENT DOCUMENTS

| | | |
|---|---|---|
| EP | 1013896 A2 | 6/2000 |
| EP | 1726804 A2 | 11/2006 |

(Continued)

OTHER PUBLICATIONS

EP Examination Report for Application No. 17 176 741.1-1006 dated Jul. 27, 2018.

(Continued)

*Primary Examiner* — Ninh H. Nguyen
(74) *Attorney, Agent, or Firm* — Lorenz & Kopf, LLP

(57) ABSTRACT

An air turbine starter includes a support structure and a turbine having a shaft and a rotor that extends away from the shaft in a radial direction. The air turbine starter also includes a mount structure that supports the turbine for rotation relative to the support structure. The mount structure is configured to transfer a force from the turbine to the support structure. The mount structure includes a deformable member that is configured to deform when the force exceeds a predetermined threshold.

19 Claims, 5 Drawing Sheets

(56) References Cited

U.S. PATENT DOCUMENTS

| | | | |
|---|---|---|---|
| 8,262,353 B2* | 9/2012 | Storace | F01D 21/04 384/535 |
| 8,376,700 B2* | 2/2013 | Le Saint | F02C 7/277 415/214.1 |
| 2012/0006035 A1 | 1/2012 | Makulec et al. | |
| 2013/0022448 A1 | 1/2013 | Jadczak et al. | |
| 2013/0149139 A1 | 6/2013 | Wallace et al. | |
| 2015/0176431 A1 | 6/2015 | Raykowski et al. | |
| 2015/0292414 A1 | 10/2015 | Geck et al. | |

FOREIGN PATENT DOCUMENTS

| | | |
|---|---|---|
| EP | 3006680 A1 | 4/2016 |
| EP | 3115551 A1 | 1/2017 |

OTHER PUBLICATIONS

Extended EP Search Report for Application No. 17176741.1-1610 dated Nov. 27, 2017.

\* cited by examiner

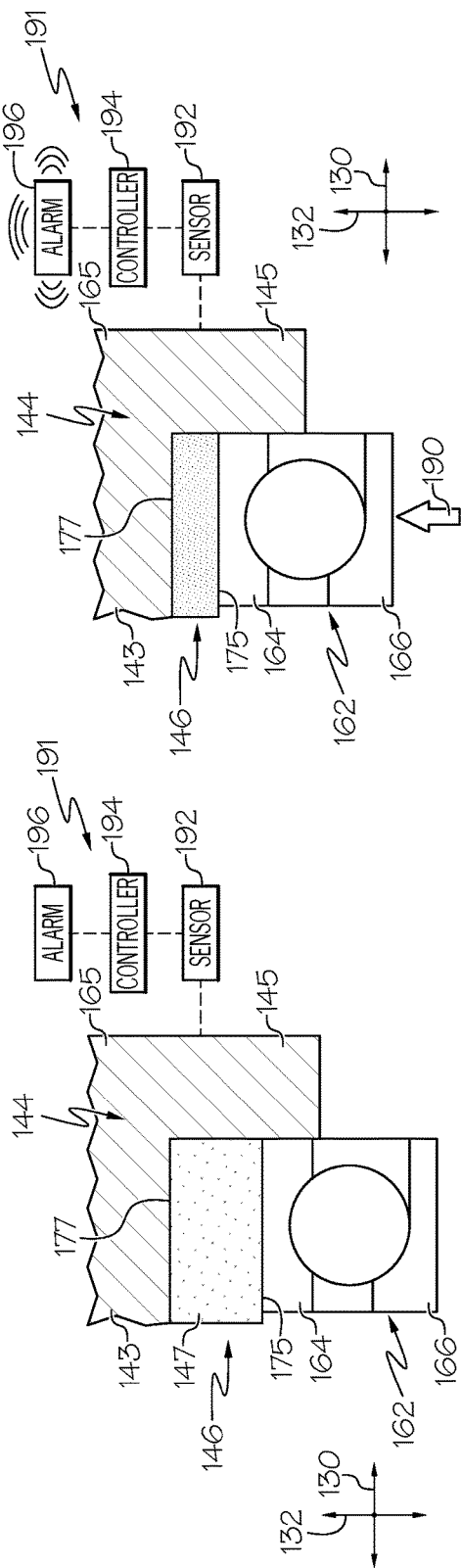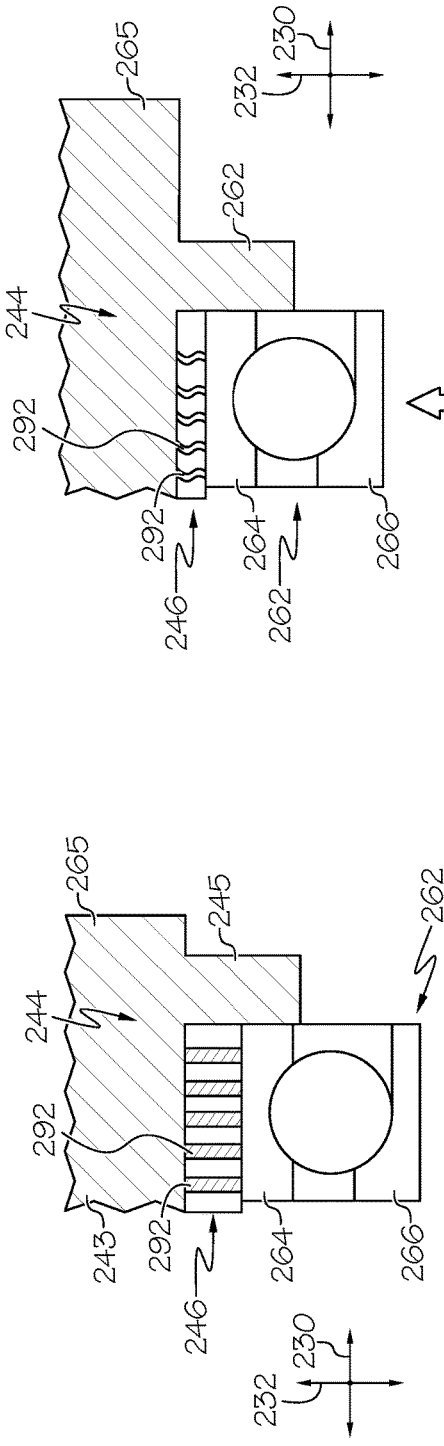

DEFORMABLE TURBINE BEARING MOUNT FOR AIR TURBINE STARTER

TECHNICAL FIELD

The present disclosure generally relates to an air turbine starter and, more specifically, to a deformable turbine bearing mount for an air turbine starter.

BACKGROUND

An air turbine starter (ATS) may be used when starting an engine, such as a gas turbine engine of an aircraft or other vehicle. Generally, the ATS can include a rotatable turbine. During startup of the gas turbine engine, air can be selectively fed to the ATS to rotate the turbine. Rotation of the ATS turbine can, in turn, rotate one or more parts of the gas turbine engine. Once the parts are rotating at a sufficient speed due to torque input from the ATS, combustion may begin in the gas turbine engine.

During rotation, the turbine may, in rare circumstances, subject other parts of the ATS to relatively high dynamic forces. Accordingly, it is desirable to provide a deformable turbine bearing mount for an air turbine starter, which deforms when the forces exceed a predetermined threshold to significantly reduce the dynamic loads. Furthermore, other desirable features and characteristics of the present disclosure will become apparent from the subsequent detailed description and the appended claims, taken in conjunction with the accompanying drawings and the foregoing technical field and background.

BRIEF SUMMARY

In one embodiment, an air turbine starter includes a support structure and a turbine having a shaft and a rotor that extends away from the shaft in a radial direction. The air turbine starter also includes a mount structure that supports the turbine for rotation relative to the support structure. The mount structure is configured to transfer a force from the turbine to the support structure. The mount structure includes a deformable member that is configured to deform when the force exceeds a predetermined threshold.

Additionally, in one embodiment, a deformable member of a mount structure of an air turbine starter includes an inner member configured to abut an outer race of a bearing. The bearing is configured to support rotation of a turbine of the air turbine starter. The deformable member also includes an outer member configured to fixedly attach to a support structure of the air turbine starter. Furthermore, the deformable member includes a transverse support member that extends between the inner member and the outer member. The transverse support member is configured to transfer a force from the inner member to the outer member. Additionally, the deformable member includes a deformable portion configured to deform when the force exceeds a predetermined threshold.

Furthermore, other desirable features and characteristics of the air turbine starter will become apparent from the above background, the subsequent detailed description, and the appended claims, taken in conjunction with the accompanying drawings.

BRIEF DESCRIPTION OF THE DRAWINGS

The present disclosure will hereinafter be described in conjunction with the following drawing figures, wherein like numerals denote like elements, and wherein:

FIG. 5 is a detail cross-sectional view of the mount structure according to various embodiments of the present disclosure, wherein the deformable member is shown in an undeformed configuration;

FIG. 6 is a detail cross-sectional view of the mount structure of FIG. 5, wherein the deformable member is shown in a deformed configuration;

FIG. 7 is a detail cross-sectional view of the mount structure according to various embodiments of the present disclosure, wherein the deformable member is shown in an undeformed configuration; and FIG. 8 is a detail cross-sectional view of the mount structure of FIG. 7, wherein the deformable member is shown in a deformed configuration.

DETAILED DESCRIPTION

Figure 1:
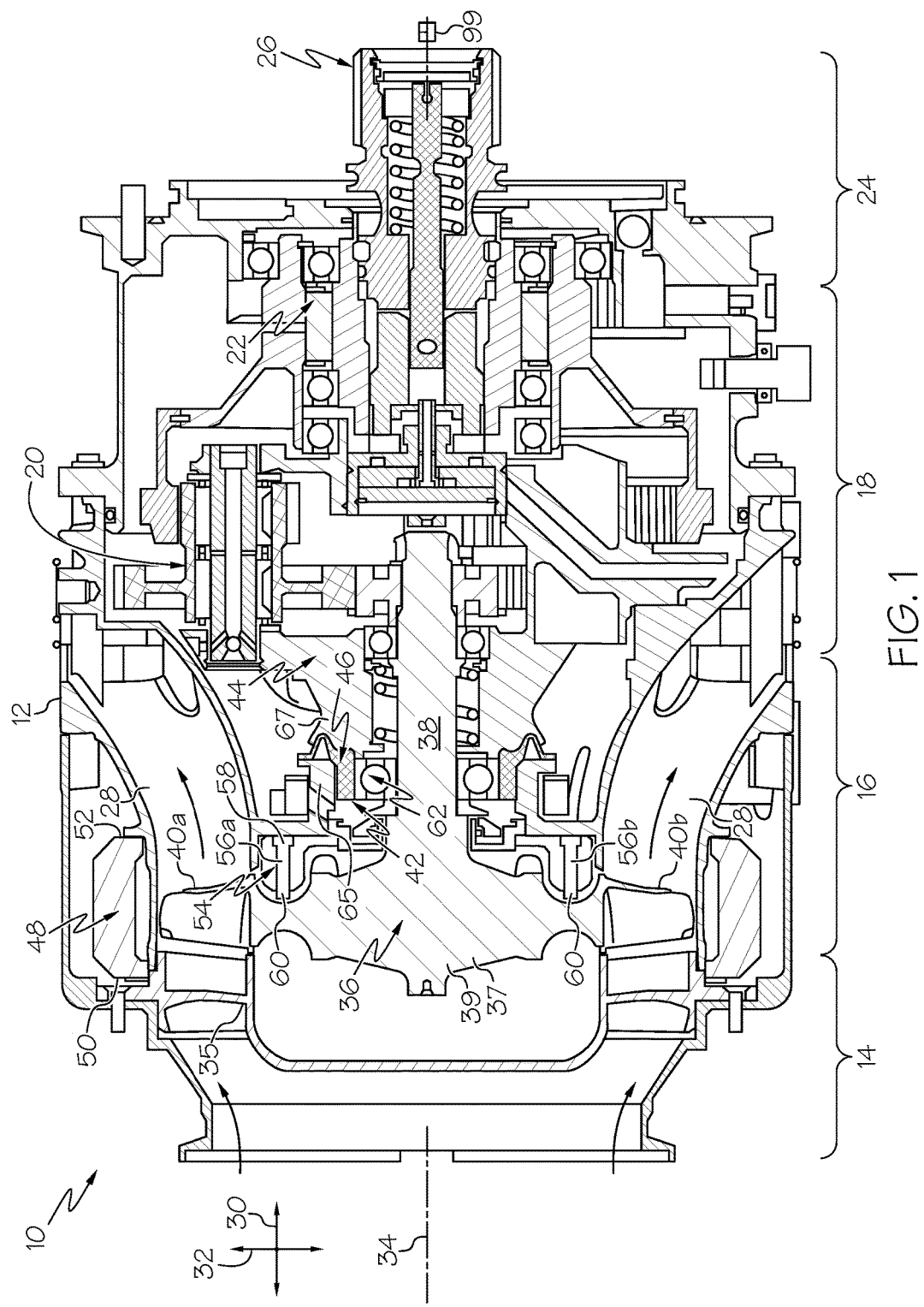
FIG. 1 is a schematic cross-sectional view of an air turbine starter according to exemplary embodiments of the present disclosure, wherein the cross-section is taken along a longitudinal axis of the air turbine starter.

The following detailed description is merely exemplary in nature and is not intended to limit the present disclosure or the application and uses of the present disclosure. Furthermore, there is no intention to be bound by any theory presented in the preceding background or the following detailed description. In addition, those skilled in the art will appreciate that embodiments of the present disclosure may be practiced in conjunction with any type of device that would benefit from a deformable turbine bearing mount that deforms when forces in the mount exceed a predetermined threshold. It will also be appreciated that the air turbine starter and the deformable turbine mount described herein is merely one exemplary embodiment according to the present disclosure. Moreover, the deformable turbine bearing mount may be used with an air turbine starter for a gas turbine engine that is onboard a mobile platform or vehicle (e.g., a bus, motorcycle, train, motor vehicle, marine vessel, aircraft, rotorcraft and the like). The various teachings of the present disclosure may also be used with an air turbine starter and/or a gas turbine engine associated with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale unless otherwise noted.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the ATS vehicle system described herein is merely one exemplary embodiment of the present disclosure For the sake of brevity, conventional techniques related to signal processing, data transmission, signaling, control, and other functional aspects of the systems (and the individual operating components of the systems) may not be described in detail herein.

Turning now to FIG. 1, an air turbine starter 10 (ATS) is illustrated in cross-section according to exemplary embodiments. As will be discussed, the ATS 10 may be used, for example, when starting a main engine, which is schematically illustrated and indicated at 99. In some embodiments, the main engine 99 may be a gas turbine engine of an aircraft or other vehicle.

In this example, the ATS 10 defines a longitudinal direction 30. The ATS 10 also defines a radial direction 32.

Generally, the ATS 10 includes an inlet section 14, a turbine section 16, a transmission section 18, and an output section 24. The inlet section 14, turbine section 16, transmission section 18, and output section 24 may be arranged sequentially along the longitudinal direction 30.

The ATS 10 includes an outer housing 12, which may be hollow to contain other components of the ATS 10. The outer housing 12 may be spaced away from one or more inner components of the ATS 10 to define at least one air flow passage 28. The air flow passage 28 may extend (in a downstream direction) from the inlet section 14 and through the turbine section 16.

The turbine section 16 includes a turbine 36. The turbine section 16 may also include a stator 35, which directs air toward the turbine 36. The turbine 36 may include a rotor 39, which includes a disc-like hub 37 and a plurality of blades 40a, 40b. The turbine 36 may also include a shaft 38. The rotor 39 may be coupled to one end of the shaft 38 and may extend away from the shaft 38 in the radial direction 32. The shaft 38 may be centered on and may extend along a longitudinal axis 34, which extends through the ATS 10 in the longitudinal direction 30. The hub 37 of the rotor 39 may extend in the radial direction 32 away from the shaft 38. The blades 40a, 40b may be coupled to the hub 37 and may be spaced evenly and circumferentially about the hub 37. Thus, the blades 40a, 40b may extend away from the hub 37, the shaft 38, and the longitudinal axis 34 along the radial direction 32. As will be discussed in detail, the rotor 39 and shaft 38 may be supported to rotate as a unit, relative to the outer housing 12. Accordingly, the turbine 36 may rotate within the ATS 10 during operation.

The ATS 10 additionally includes a mount structure 42 and a support structure 44. The mount structure 42 supports the turbine 36 for rotation relative to the support structure 44. In some embodiments, the mount structure 42 may include one or more bearings 62 (e.g., ball or roller bearings) that rotatably support the shaft 38. The bearings 62 may be disposed between the shaft 38 and support structure 44. Accordingly, the shaft 38 (and, thus, the turbine 36) may be supported for rotation relative to the support structure 44 via the bearings 62.

During normal operations of the ATS 10, the turbine 36 rotates at relatively high speeds, and the center of gravity of the turbine 36 is substantially centered on the longitudinal axis 34. Accordingly, the turbine 36 generally rotates in a balanced manner, and forces transmitted from the shaft 38, through bearings 62 of the mount structure 42, to the support structure 44 may be relatively low. However, in certain instances, rotation of the turbine 36 may become unbalanced (i.e., eccentric). In other words, the center of gravity of the turbine 36 may be spaced apart at a distance in the radial direction 32 from the longitudinal axis 34. This may occur, for example, if one or more blades 40a, 40b becomes displaced relative to the hub 37 of the rotor 39. The turbine 36 may, thus, become unbalanced, causing significant forces to be directed from the shaft 38 to the mount structure 42. High forces can also occur if the unbalanced turbine 36 is operated near a critical speed (or resonance) where the centrifugal force associated with the eccentricity is magnified by the resonance condition.

The mount structure 42 includes one or more features designed for such an event. For example, in some embodiments, the mount structure 42 of the ATS 10 includes a deformable member 46. In this example, the mount structure 42 deforms when forces exceed a predetermined threshold. In some embodiments, the deformable member 46 is frangible, such that the deformable member fractures when the forces exceed the predetermined threshold. In additional embodiments, the deformable member 46 is plastically deformable, and the deformable member 46 plastically deforms when the forces exceed the predetermined threshold. This fracture/plastic deformation of the deformable member 46 may prevent excessive forces from being transferred to the support structure 44, may help control the effects of the unbalanced rotation of the turbine 36, and/or provide other benefits that will be discussed.

It will be appreciated, however, that the deformable member 46 of the mount structure 42 may be configured to remain rigid for supporting rotation of the turbine 36 when forces are below the predetermined threshold. For example, the deformable member 46 may be configured to remain rigid and undeformed as the turbine 36 rotates in a balanced manner.

Referring back to FIG. 1, additional features of the ATS 10 will be discussed. The transmission section 18 may generally include a gear train 20. The gear train 20 may be engaged with the shaft 38 of the turbine 36 so that rotation of the shaft 38 transfers torque through a series of gears (e.g., a planetary gear set) of the gear train 20. The gear train 20 may also be engaged with an output shaft 26 of the output section 24. Rotation of the turbine 36 may input torque to the gear train 20, and the gear train 20 may provide a predetermined gear reduction for providing torque to the output shaft 26 of the output section 24. The output shaft 26 may be engaged to an input shaft of the main engine 99. Accordingly, rotation of the output shaft 26 of the ATS 10 may drive rotation of the input shaft of the main engine 99.

The blades 40a, 40b of the turbine 36 may be disposed within the flow path of the flow passage 28. Accordingly, air may be selectively supplied to flow through the air flow passage 28, and the air flow may drive the turbine 36 in rotation. Torque may thus be supplied from the shaft 38, through the gear train 20, to the output shaft 26. In some embodiments, this process may be used to start the main engine 99 (e.g., before ignition of the main engine).

The transmission section 18 of the ATS 10 may also include a clutch 22. The clutch 22 may allow torque to transfer from the gear train 20 to the output shaft 26, for example, when starting the main engine 99 as discussed above. Once the main engine 99 has started, the clutch 22 may move to an unclutched position to allow the output shaft 26 to rotate faster than output components of the gear train 20 (i.e., so that torque from the main engine 99 does not transfer back into the ATS 10).

The ATS 10 may additionally include a containment member 48. The containment member 48 may be generally annular and substantially coaxial with the longitudinal axis 34. The containment member 48 may be fixed to the outer housing 12, proximate the hub 37 and blades 40a, 40b of the rotor 39. The containment member 48 may include a forward end 50 and a rear end 52. The containment member 48 may surround the hub 37 and the blades 40a, 40b such that the hub 37 and blades 40a, 40b are disposed between the forward end 50 and rear end 52 with respect to the longitudinal axis 34. The containment member 48 may be made from and/or include high-strength material.

In some embodiments, the deformable member 46 of the mount structure 42 is configured such that the containment member 48 is able to substantially contain the hub 37, the blades 40a, 40b, and/or fragments of either in the event of malfunction. For example, as will be discussed in relation to FIG. 4, the deformable member 46 may be configured to deform, allowing the turbine 36 to move substantially along the longitudinal axis 34, and yet the hub 37 and blades 40a, 40b remains between the forward and rear ends 50, 52 of the containment member 48. Also, as will be discussed in relation to FIGS. 5-8, the deformable member 46 may be configured to deform, allowing the turbine 36 to move substantially in the radial direction 32, and yet the hub 37 and blades 40a, 40b remains between the forward and rear ends 50, 52 of the containment member 48. Thus, the containment member 48 contains the hub 37 and/or blades 40a, 40b as the deformable member 46 deforms.

Furthermore, the ATS 10 may include a cutter member 54. The cutter member 54 may include a plurality of cutters 56a, 56b, each having a mounted end 58 and a cutter end 60. The cutters 56a, 56b may be arranged about the longitudinal axis 34. The mounted ends 58 may be fixedly attached to the support structure 44, and the ends 60 may be directed toward the rotor 39 of the turbine 36. During normal operations represented in FIGS. 1 and 2, the rotor 39 may be spaced apart from the cutters 56a, 56b along the longitudinal direction 30. However, during unbalanced rotation of the turbine 36 represented in FIG. 4, the deformable member 46 may deform to allow movement of the turbine 36 along the longitudinal direction 30. This movement may allow the rotor 39 to impact the cutter end 60 of the cutters 56a, 56b.

Figure 2:
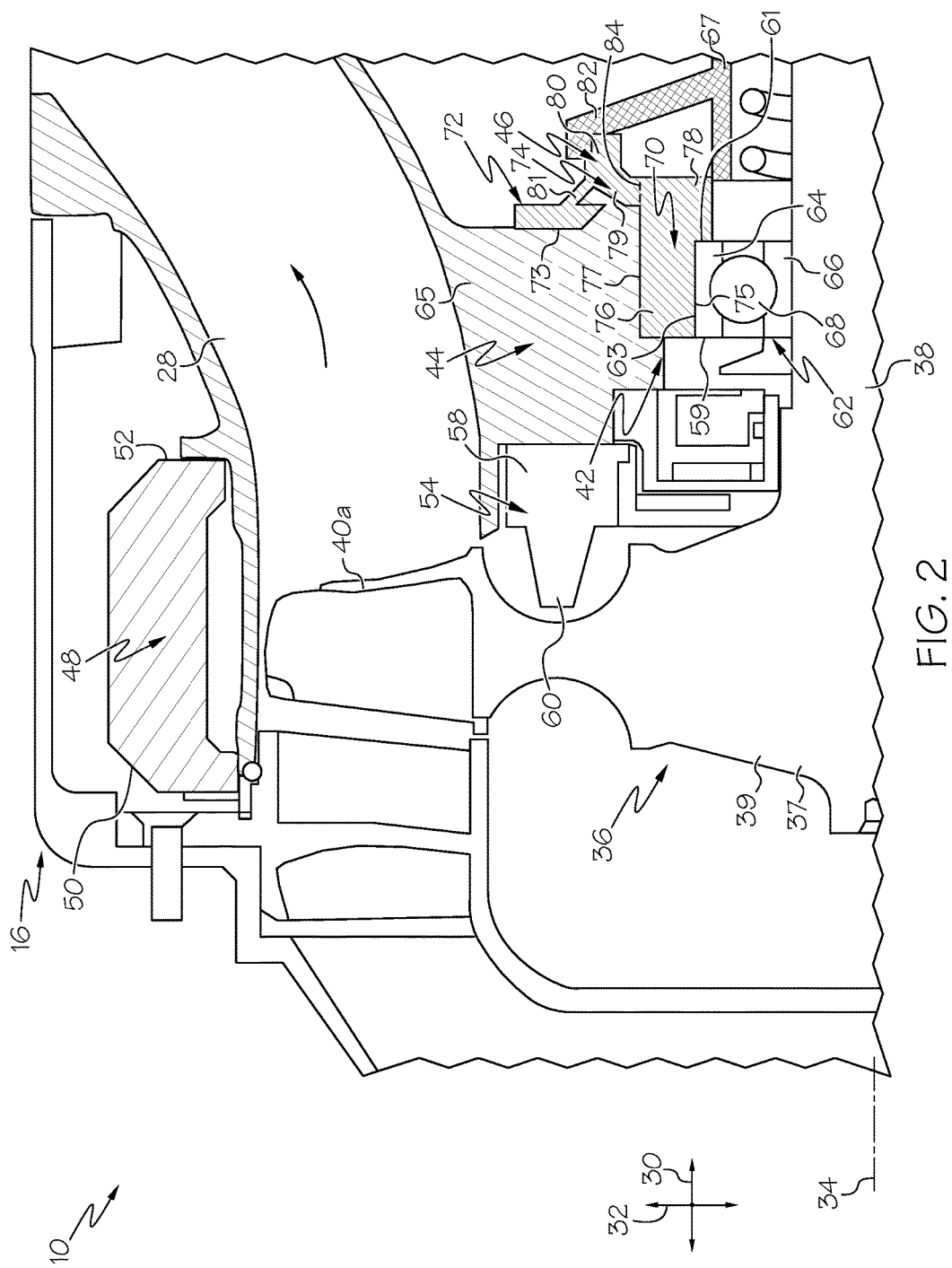
FIG. 2 is a detail cross-sectional view of a mount structure for a turbine of the air turbine starter of FIG. 1 according to exemplary embodiments, wherein a deformable member of the mount structure is shown in an undeformed configuration and the turbine is shown in a first position.
Figure 3:
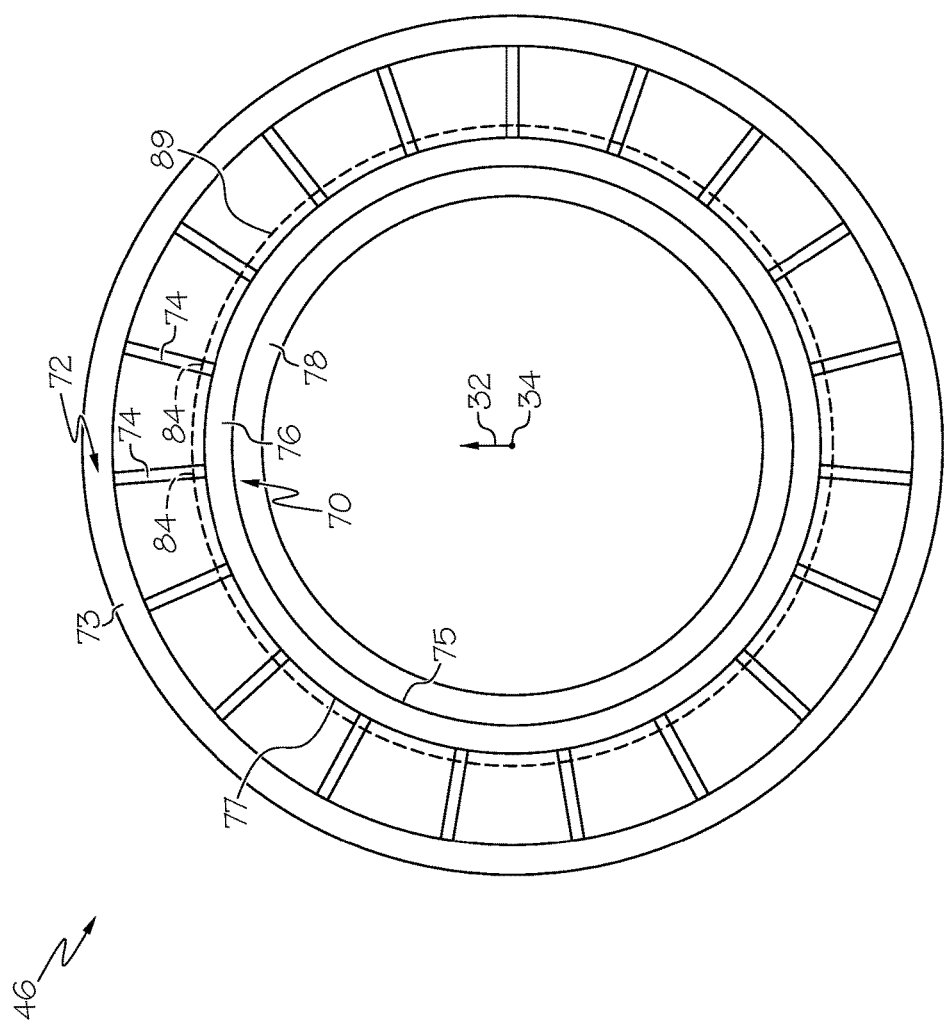
FIG. 3 is a schematic end view of the deformable member of the mount structure of FIG. 2 according to exemplary embodiments.
Figure 4:
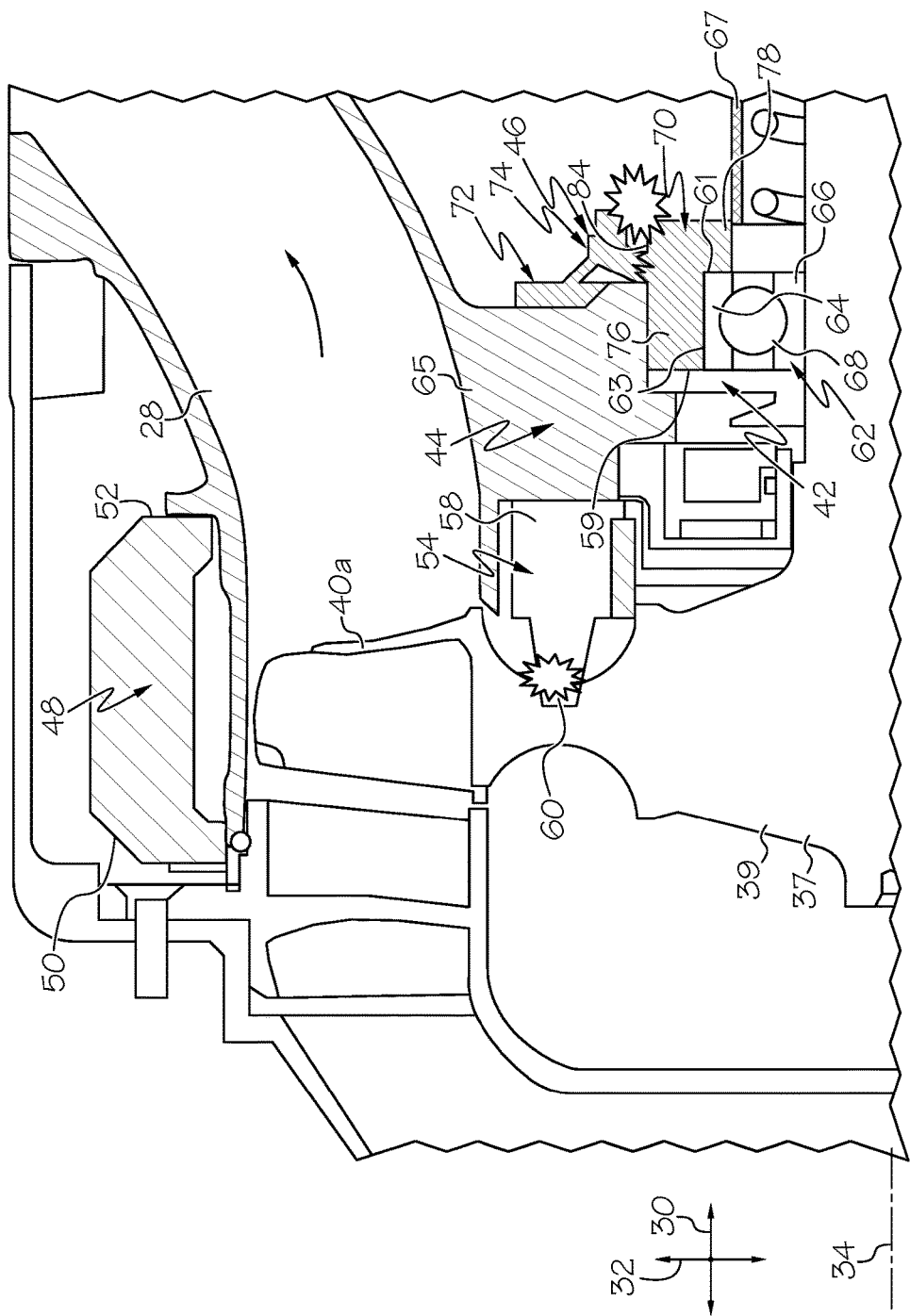
FIG. 4 is a detail cross-sectional view of the mount structure of FIG. 2, wherein the deformable member is shown in a deformed configuration and the turbine is shown in a second position.

Referring now to FIGS. 2-4, the support structure 44 and the mount structure 42 will be discussed in greater detail according to exemplary embodiments. FIG. 2 illustrates the mount structure 42 in a first, undeformed configuration such that the mount structure 42 supports the turbine 36 for rotation relative to the support structure 44. FIG. 3 illustrates the deformable member 46 of the mount structure 42 in the first, undeformed configuration according to exemplary embodiments. FIG. 4 illustrates the mount structure 42 in a second, deformed configuration according to exemplary embodiments. The mount structure 42 of FIGS. 2-4 will be described in detail as being a frangible mount structure 42; however, it will be appreciated that the mount structure 42 of FIGS. 2-4 may be configured as a plastically deformable mount structure 42 without departing from the scope of the present disclosure.

As shown in FIG. 2, the support structure 44 may include a first support member 65 (i.e., an exhaust housing) and a second support member 67. The first support member 65 may surround the shaft 38, proximate the rotor 39, and the first support member 65 may partly define the air flow passages 28 in some embodiments. The second support member 67 may also surround the shaft 38, and as shown in FIGS. 1 and 2, the second support member 67 may extend along the longitudinal axis 34, away from the first support member 65 and the rotor 39.

Additionally, in some embodiments represented in FIG. 2, the bearing 62 may be a thrust bearing that includes an inner race 66, an outer race 64, and a plurality of bearing elements 68. The inner race 66 and outer race 64 may each be generally annular. The outer race 64 may encircle the inner race 66 and may be coaxial therewith. The bearing elements 68 may be disposed between the inner and outer races 66, 64 and may roll to allow the inner race 66 to rotate relative to the outer race 64. The inner race 66 may encircle and may be fixed to the shaft 38 of the turbine 36. An outer diameter 63 of the outer race 64 may abut the deformable member 46 of the mount structure 42. A forward end 59 of the outer race 64 may face toward the first support member 65. A rear end 61 of the outer race 64 may face toward the second support member 67 and a portion of the deformable member 46.

As shown in FIGS. 2 and 3, the deformable member 46 may include an inner member 70 and an outer member 72, which are generally annular and which are separated by a plurality of transverse support members 74. The transverse support members 74 may extend substantially in the radial direction 32 between the inner and outer members 70, 72. In the illustrated embodiment of FIG. 3, the plurality of transverse support members 74 are spaced substantially evenly about the circumference of the deformable member 46. In additional embodiments, the transverse support members 74 are spaced unevenly about the circumference of the deformable member 46.

In some embodiments, the deformable member 46 may be a unitary, one-piece part such that the inner member 70, transverse support members 74, and outer member 72 are integrally attached. In other embodiments, the deformable member 46 may be assembled from separate pieces. Also, the deformable member 46 may be made from any suitable material, such as metal or composite material.

The inner member 70 may include a radial member 76 and a thrust member 78. The radial member 76 may be annular, and as shown in FIG. 2, the thrust member 78 may extend radially inward toward the longitudinal axis 34 from a rear end of the radial member 76.

The outer member 72 may be annular and may have a cross sectional profile (e.g., FIG. 2) that extends primarily in the radial direction 32. The outer member 72 may also include a forward face 73.

As shown in FIG. 2, one or more of the transverse support members 74 may include an inner leg 79, an outer leg 81, and a flange 80. The inner leg 79 may be angled with respect to the radial direction 32, and directed slightly away from the first support member 65. The inner leg 79 may terminate at the flange 80. The outer leg 81 may be angled with respect to the radial direction 32, and directed away from the flange 80 and toward the first support member 65. The flange 80 may extend substantially along the longitudinal direction 30, away from the first support member 65.

The outer member 72 may be attached to the outer legs 81 of the transverse support members 74. The forward face 73 of the outer member 72 may face opposite the transverse support members 74.

Additionally, the deformable member 46 may include a frangible portion 84. In some embodiments, the frangible portion 84 may be included on one or more of the transverse support members 74. (In FIGS. 2 and 3, the frangible portion 84 is represented by broken lines.) As shown in FIG. 3, each of the transverse support members 74 may include a respective frangible portion 84, and the frangible portions 84 may be aligned in an imaginary annulus (represented by a broken circle 89 in FIG. 3) about the longitudinal axis 34. In some embodiments, the frangible portions 84 may be disposed on the inner leg 79 of the respective transverse support member 74, proximate the inner member 70 of the deformable member 46.

The frangible portions 84 may be configured to fracture when forces exceed a predetermined threshold. The threshold can be higher than the normally expected operating loads experienced by the deformable member 46. More specifically, in some embodiments, the deformable member 46 is subjected to a maximum of approximately 100 pounds force during normal, balanced rotation of the turbine 36. Thus, the predetermined threshold (i.e., the fracture strength) of the frangible portion 84 may be greater than 100 pounds force. In some embodiments, the predetermined threshold is between approximately two hundred and approximately fifteen thousand pounds force. Additionally, in some embodiments, the predetermined threshold is between approximately three thousand and approximately four thousand pounds force. Accordingly, in some embodiments, the predetermined threshold can be an order of magnitude greater than the highest load experienced by the deformable member 46 during normal, balanced rotation of the turbine 36.

In some embodiments, the frangible portions 84 may be a thinned area of the respective transverse support member 74, such that the frangible portion 84 is more prone to fracture than thicker adjacent areas of the transverse support member 74. In additional embodiments, the material of the frangible portion 84 may have a lower fracture strength than adjacent areas of the transverse support member 74. Also, in some embodiments, the frangible portion 84 may be constructed to fracture such that forces directed along a predetermined vector are more likely cause fracture than forces directed along other vectors. Thus, when loaded above the predetermined threshold, the frangible portion(s) 84 may fracture.

In this example, portions of the deformable member 46 are disposed between the outer race 64 of the bearing 62 and the first support member 65 of the support structure 44. For example, in some embodiments, the inner diameter surface 75 of the radial member 76 may be fixed to the outer diameter 63 of the outer race 64 of the bearing 62. Also, an outer diameter surface 77 of the radial member 76 may abut the first support member 65. Additionally, the thrust member 78 of the deformable member 46 may abut the rear end 61 of the outer race 64 of the bearing 62. The thrust member 78 may be configured to resist thrust forces from the turbine 36 and bearing 62, directed substantially in the longitudinal direction 30.

The deformable member 46 may also be attached to the second support member 67. For example, the second support member 67 may include one or more projections 82 that project toward and attach to the flange 80 of the respective transverse support member 74.

Furthermore, the deformable member 46 may be attached to the first support member 65. For example, the forward face 73 of the outer member 72 may be fixed to the first support member 65. In some embodiments, the forward face 73 may be attached via fasteners to the first support member 65.

It will be appreciated that the deformable member 46 could be attached differently within the ATS 10 without departing from the scope of the present disclosure. For example, in some embodiments, the deformable member 46 may abut the inner race 66 of the bearing 62 without departing from the scope of the present disclosure. Other variations also fall within the scope of the present disclosure.

In some embodiments, when the turbine 36 is rotating in a balanced fashion (e.g., the center of gravity of the turbine 36 is disposed substantially on the longitudinal axis 34 and the turbine 36 is rotating about the longitudinal axis 34), the deformable member 46 may remain rigid and remain in the undeformed configuration illustrated in FIGS. 2 and 3. The deformable member 46 may withstand the radial forces (directed along the radial direction 32) and the longitudinal forces (directed along the longitudinal direction 30). In other words, the deformable member 46 may be subjected to forces that are below the predetermined threshold, and the deformable member 46 may remain in the first, undeformed configuration as a result.

However, if the turbine 36 begins to rotate in an unbalanced manner (e.g., due to damage to one or more blades 40a, 40b), forces may exceed the predetermined threshold of the frangible portions 84 of the deformable member 46. Thus, if forces on the deformable member 46 exceed this predetermined threshold, the deformable member 46 may deform as represented in FIG. 4. As shown, the frangible portions 84 of the deformable member 46 may fracture under these increased forces, allowing motion of the turbine 36 along the longitudinal direction 30 and/or radial direction 32 relative to surrounding structure. In some embodiments, the frangible portion 84 fractures, allowing the inner member 70 to move substantially along the longitudinal direction 30 relative to the outer member 72. Accordingly, the turbine 36, bearing 62, inner member 70 of the deformable member 46, and the second support member 67 may move as a unit in the longitudinal direction 30 relative to the outer member 72 of the deformable member 46 and the first support member 65. (Although FIG. 4 illustrates movement of these components primarily in the longitudinal direction 30, it will be appreciated that fracture of the deformable member 46 may allow movement along the radial direction 32 in addition to or instead of the longitudinal movement.)

In some embodiments, fracture of the deformable member 46 may allow the rotor 39 of the turbine 36 to move toward the cutter member 54. For example, as shown in FIG. 4, the rotor 39 may impact the cutter end 60 of the cutters 56a, 56b. In some embodiments, the impact may separate one or more blades 40a, 40b from the hub 37. Also, the hub 37, blades 40a, 40b, and fragments of the rotor 39 released from impact with the cutters 56a, 56b may remain substantially surrounded and contained by the containment member 48, even after fracture of the deformable member 46. In other words, even though the deformable member 46 has fractured and the turbine 36 has moved to impact the cutter member 54, the hub 37 and blades 40a, 40b may remain between the forward end 50 and the rear end 52 of the containment member 48.

Accordingly, if the turbine 36 rotates in an unbalanced manner, for example, due to displacement, deformation, or damage to the blades 40a, 40b, the deformable member 46 fractures due to increased forces resulting from the unbalanced rotation. Once the mount fractures, radial restraint is promptly removed allowing the unbalanced rotor 39 to naturally rotate again about its center of gravity, significantly reducing dynamic loads transferred to the first support member 65 and/or second support member 67 of the support structure 44. Thus, there may be less overall damage to the ATS 10.

Referring now to FIGS. 5 and 6, additional embodiments of the present disclosure are illustrated. Components that correspond with those of FIGS. 1-4 are indicated with corresponding reference numbers increased by 100.

For purposes of simplicity and clarity, only the bearing 162 the support structure 144, and the deformable member 146 are shown. It will be appreciated that other components can be substantially similar to those shown in FIGS. 1-4.

In some embodiments represented in FIG. 5, the support structure 144 may include the first support member 165 discussed above. However, the first support member 165 may include a radial portion 143 and a thrust member 145.

The deformable member 146 may be annular. The deformable member 146 may also include a plurality of voids 147 in some embodiments. For example, the deformable member 146 may have a honeycomb structure or other structure having a plurality of embedded, hollow voids 147 therein.

The inner diameter 175 may abut the outer race 164 of the bearing 162, and an outer diameter 177 may be fixed to the radial portion 143 of the first support member 165. The thrust member 145 of the first support member 165 may project in the radial direction 132 to bypass the rear end of the deformable member 146 and to abut the outer race 164 of the bearing 162. Thus, the thrust member 145 may support the outer race 164 in a substantially fixed position along the longitudinal direction 130 when the deformable member is in the undeformed configuration (FIG. 5).

In some embodiments, the deformable member 146 may be configured to plastically deform when subjected to forces above the predetermined threshold. In some embodiments, radial forces (indicated by arrow 190 in FIG. 6) may crush, compress, or otherwise permanently and plastically deform the deformable member 146. Accordingly, the bearing 162 (and the unillustrated turbine shaft) may move in the radial direction 132 toward the radial portion 143 of the first support member 165. In other embodiments, the deformable member 146 may be configured to stretch, twist, or otherwise move when forces exceed the predetermined threshold.

Additionally, in some embodiments, a sensor system 191 may be included for detecting and informing a user that the deformable member 146 has deformed. Specifically, in some embodiments, the sensor system 191 may include a sensor 192, a controller 194, and an output device 196.

The sensor 192 may be of any suitable type of sensor that observes a measurable condition of the deformable member 146, such as a condition indicative of the deformation of the deformable member 146. In one example, the sensor 192 is an accelerometer that observes a transient response of the ATS to the dynamic load associated with the deformation of the deformable member 146. In a further example, the sensor 192 is a position sensor that observes a position of the deformable member 146, the bearing 162, and/or the turbine of the ATS, and the sensor 192 generates sensor signals based thereon. In another example, the sensor 192 is an air flow sensor that observes airflow through the ATS and generates sensor signals based thereon. In another example, the sensor 192 is an electrical sensor (e.g., a fuse) that detects a change in voltage as the deformable member 146, bearing 162, and/or turbine move, and the sensor 192 generates sensor signals based thereon.

The sensor 192 may be in communication with the controller 194 (i.e., control module) over a suitable communication architecture that facilitates the transfer of power, data, commands, etc. The controller 194 may receive and process the signals from the sensor 192 and determine deformation of the deformable member 146 based thereon. The controller 194 may also output control signals to the output device 196 if the controller 194 determines that deformation of the deformable member 146 has occurred. Based on these control signals, the output device 196 may output an alarm and provide a warning to a user that indicates the deformation of the deformable member 146. In some embodiments, the output device 196 may be a display, a lamp, or other device that outputs a visual warning to the user. In additional embodiments, the output device 196 may provide an audible alarm. In further embodiments, the output device 196 may provide a tactile alarm to the user.

Accordingly, the deformable member 146 may plastically deform when subjected to excessive forces (e.g., due to unbalanced rotation of the turbine). The deformable member 146 may deform to reduce the amount of force transferred to the support structure 144. In some scenarios, once deformed, the deformable member 146 may be replaced so that the ATS may resume normal operations.

Referring now to FIGS. 7 and 8, additional embodiments of the present disclosure are illustrated. Components that correspond with those of FIGS. 1-4 are indicated with corresponding reference numbers increased by 200. The embodiments of FIGS. 7 and 8 may be substantially similar to those of FIGS. 5 and 6. However, the deformable member 246 may include a plurality of radial members 292. The radial members 292 may be elongate and may extend substantially in the radial direction 232, between the outer diameter of the outer race 264 of the bearing 262 and the radial member 243 of the support structure 244. In other embodiments, the radial members 292 may be thin, annular members that encircle the bearing 262. The radial members 292 may be made of any suitable material, such as metal or composite.

The radial members 292 may be configured to plastically deform when subjected to forces that exceed the predetermined threshold. For example, the radial members 292 may bend, buckle, or otherwise plastically deform when subjected to excessive forces.

In the undeformed configuration of FIG. 7, the radial members 292 may support rotation of the turbine (now shown). However, if forces exceed the predetermined threshold, the radial members 292 may plastically deform. As a result, the bearing 262 (and the unillustrated shaft of the turbine) may move substantially in the radial direction 232 toward the support structure 244.

In summary, the deformable mount structure of the present disclosure provides support for the turbine during normal operations. However, if the turbine begins to rotate in an unbalanced manner, the mount structure may deform (e.g., via fracture and/or plastic deformation). This deformation may help reduce the amount of force transferred from the turbine to the support structure, the gear train, the clutch, and/or other structures. Furthermore, this deformation may reduce repairs to the ATS.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An air turbine starter comprising:
a support structure;
a turbine that includes a shaft and a rotor that extends away from the shaft in a radial direction;
a mount structure that supports the turbine for rotation relative to the support structure, the mount structure configured to transfer a force from the turbine to the support structure, the mount structure including a plastically deformable member that is configured to plastically deform when the force exceeds a predetermined threshold.

2. The air turbine starter of claim 1, wherein the deformable member is a frangible member that is configured to fracture when the force exceeds the predetermined threshold.

3. The air turbine starter of claim 2, further comprising a cutter member that is fixed to the support structure; and
wherein the deformable member is configured to fracture and allow the turbine to move toward and impact the cutter member.

4. The air turbine starter of claim 3, wherein the shaft of the turbine extends along a longitudinal axis;
wherein the cutter member includes a plurality of cutters that are arranged about the longitudinal axis, and wherein the plurality of cutters are spaced apart from the rotor with respect to the longitudinal axis; and
wherein the deformable member is configured to fracture and allow the turbine to move substantially along the longitudinal axis toward the cutter member so that at least one of the plurality of cutters impacts the rotor.

5. The air turbine starter of claim 4, further comprising a containment member that is fixed relative to the support structure;
wherein the containment member is configured to contain the turbine as the turbine moves substantially along the longitudinal axis toward the cutter member.

6. The air turbine starter of claim 1, wherein the deformable member is configured to plastically deform and allow the turbine to move substantially along the radial direction.

7. The air turbine starter of claim 1, further comprising:
a sensor that observes a condition indicative of the plastic deformation of the deformable member and generates sensor signals based thereon;
a controller that receives and processes the sensor signals to determine the plastic deformation of the deformable member and generates a control signal based thereon; and
an output device that outputs a warning to a user indicative of the plastic deformation based on the control signal.

8. The air turbine starter of claim 1, wherein the plastically deformable member is a crushable member that includes a plurality of voids, wherein the plastically deformable member is configured to crush when the force exceeds the predetermined threshold.

9. The air turbine starter of claim 1, wherein the plastically deformable member includes a plurality of elongate radial members that extend in the radial direction, wherein at least one of the plurality of elongate radial members is configured to buckle when the force exceeds the predetermined threshold.

10. The air turbine starter of claim 1, further comprising a bearing with an inner race, an outer race, and moveable bearing members disposed between the inner and outer races,
wherein the inner race is attached the shaft of the turbine, wherein the outer race is attached to the deformable member; and
wherein the deformable member is disposed between the support structure and the outer race.

11. The air turbine starter of claim 10, further comprising a thrust member that extends from the support structure to the outer race of the bearing, the thrust member configured to support the outer race in a substantially fixed position along a longitudinal axis when the deformable member is in an undeformed configuration.

12. An air turbine starter comprising:
a support structure;
a turbine that includes a shaft and a rotor that extends away from the shaft in a radial direction;
a mount structure that supports the turbine for rotation relative to the support structure, the mount structure configured to transfer a force from the turbine to the support structure, the mount structure including a plastically deformable member that is configured to plastically deform when the force exceeds a predetermined threshold;
the deformable member including an inner member and an outer member that are separated by a plurality of transverse support members, the plurality of transverse support members extending substantially in the radial direction between the inner and outer members.

13. The air turbine starter of claim 12, wherein at least some of the plurality of transverse support members include a frangible portion, the frangible portion configured to fracture when the force exceeds the predetermined threshold.

14. The air turbine starter of claim 13, wherein the frangible portion of the at least some of the plurality of transverse support members are substantially aligned into an imaginary circle that extends about a longitudinal axis of the turbine.

15. A deformable member of a mount structure of an air turbine starter, the deformable member comprising:
an inner member configured to abut an outer race of a bearing, the bearing configured to support rotation of a turbine of the air turbine starter;
an outer member configured to fixedly attach to a support structure of the air turbine starter;
a transverse support member that extends between the inner member and the outer member, the transverse support member configured to transfer a force from the inner member to the outer member; and
a deformable portion configured to deform when the force exceeds a predetermined threshold.

16. The deformable member of claim 15, wherein the deformable portion is defined on the transverse support member.

17. The deformable member of claim 16, wherein the transverse support member is one of a plurality of transverse support members, wherein the plurality of transverse support members each extend between the inner member and the outer member;
 wherein the deformable portion is one of a plurality of deformable portions, the deformable portions each included on a respective one of the plurality of transverse support members; and
 wherein the plurality of deformable portions are aligned into an imaginary circle that extends about a longitudinal axis of the deformable member.

18. The deformable member of claim 15, wherein the deformable portion is a frangible portion configured to fracture when the force exceeds the predetermined threshold.

19. The deformable member of claim 15, wherein the deformable portion is a plastically deformable portion configured to plastically deform when the force exceeds the predetermined threshold.

* * * * *